(12) United States Patent
Ward

(10) Patent No.: US 10,521,929 B2
(45) Date of Patent: Dec. 31, 2019

(54) DETERMINATION OF TOOLPIECE POSITION

(71) Applicant: Ubisense Limited, Cambridge (GB)

(72) Inventor: Andrew Martin Robert Ward, Cambridgeshire (GB)

(73) Assignee: Ubisense Limited, Cambridge (GB)

( * ) Notice: Subject to any disclaimer, the term of this patent is extended or adjusted under 35 U.S.C. 154(b) by 349 days.

(21) Appl. No.: 15/501,939

(22) PCT Filed: Jul. 30, 2015

(86) PCT No.: PCT/GB2015/052198
§ 371 (c)(1),
(2) Date: Feb. 6, 2017

(87) PCT Pub. No.: WO2016/020647
PCT Pub. Date: Feb. 11, 2016

(65) Prior Publication Data
US 2017/0228891 A1    Aug. 10, 2017

(30) Foreign Application Priority Data

Aug. 7, 2014 (GB) .................................. 1413991.9

(51) Int. Cl.
*G06T 7/73* (2017.01)
*G05B 19/4063* (2006.01)

(52) U.S. Cl.
CPC ............ *G06T 7/74* (2017.01); *G05B 19/4063* (2013.01); *G05B 2219/40557* (2013.01); *G06T 2207/10028* (2013.01); *G06T 2207/30164* (2013.01)

(58) Field of Classification Search
USPC ................................................. 382/100, 103
See application file for complete search history.

(56) References Cited

U.S. PATENT DOCUMENTS

| 8,917,905 B1* | 12/2014 | Dill .......................... A63J 1/02 382/103 |
| 9,546,002 B1* | 1/2017 | Azcuenaga ............ B64D 43/00 |
| 9,824,437 B2* | 11/2017 | Mullins .............. G02B 27/0093 |
| 2015/0110355 A1* | 4/2015 | Dill .......................... A63J 1/02 382/103 |
| 2017/0228891 A1* | 8/2017 | Ward ....................... G06T 7/74 |

FOREIGN PATENT DOCUMENTS

| DE | 20 2012 010039 U1 | 1/2013 |
| GB | 2110427 A | 6/1983 |
| WO | 2013/029675 A1 | 3/2013 |

* cited by examiner

*Primary Examiner* — Ishrat I Sherali
(74) *Attorney, Agent, or Firm* — Vorys, Sater, Seymour and Pease LLP; Vincent M DeLuca

(57) ABSTRACT

A system for determining the location of a toolpiece, wherein: the toolpiece is carried by a tool and the tool comprises an imaging device for capturing images of the environment around the tool; and the system comprises an image processor communicatively coupled to the imaging device for receiving images therefrom and having access to one or more reference images of an expected environment, the image processor being configured to compare an image captured by the imaging device with at least one reference image to identify a match therebetween and to determine in dependence on characteristics of that match the location of the toolpiece.

20 Claims, 1 Drawing Sheet

DETERMINATION OF TOOLPIECE POSITION

This invention relates to estimating the location of an object. The object could, for example, be a tool.

The best known approach for automatically determining the location of objects is the use of satellite positioning systems such as GPS. These systems can provide an accuracy of a few metres in outdoor environments. However, there are situations in which satellite positioning systems are unable to provide enough accuracy. One such situation is when the object whose location is to be estimated is indoors, and so reception of signals from the satellites is impaired. Another is when the position of the object needs to be known with an accuracy greater than can readily be achieved through satellite positioning. Some specific examples of situations where satellite positioning is inadequate are: (i) tracking the movements of individuals who are interacting with a video game console, and (ii) tracking the movement of tools in a factory to monitor productivity or to verify that the correct processes are being performed on an item that is being manufactured. Specialised systems have been developed for these applications.

In one example of such a system a set of cameras are placed at fixed locations around the environment where an object is to be located. The cameras capture a video stream or a series of still images. Image processing software analyses the cameras' output to recognise the object that is to be monitored. By correlating the position of the object as seen by the cameras with the location of the cameras the position of the object can be estimated in three dimensions. The image processing software might be capable of recognising the object itself in the video/image feed. An example of a system of this type is the Microsoft Kinect gaming system. Alternatively, the object could carry a visually distinctive fiducial marker that is identifiable by the software. An example of this type of system is the Sony PlayStation Move Motion Controller.

In another example, the object to be located carries an acoustic transmitter. A set of acoustic receivers are placed at fixed locations around the environment where the object is to be located. The system measures the time taken for signals transmitted from the object to be received at a number of the receivers. Then, by correlating the time of flight from the transmitter to each of those receivers with the location of the receivers the position of the object can be estimated in three dimensions. An example of this type of system is the Sarissa Local Positioning System. In a similar way, other systems employ a radio transmitter carried by the object to be measured, which cooperates with multiple radio receivers located around the environment. The radio receivers may detect any of a range of parameters (for example time-of-arrival, time-difference-of-arrival, angle-of-arrival or signal strength) of radio signals sent by the transmitter. Using these parameters the location of the transmitter relative to the receivers can again be estimated.

Systems of the types described above are generally able to locate objects to an accuracy of a few tens of centimetres. This level of accuracy is sufficient for many applications. For example, a games console can operate successfully knowing the position of a user to that degree of accuracy. Similarly, on an automotive production line that degree of accuracy is sufficient to establish which vehicle on the production line a particular tool is being used on. That information could be used to monitor the productivity of a person using the tool. It could also be used to control the operation of the tool. For example, the tool may be an automated wrench being used to assemble engine mounts in a vehicle. The engine mounts may need to be tightened to different torques depending on the type of engine being installed. By monitoring the location of the tool, and thereby determining which vehicle on the production line the tool is being used on, it is possible to automatically configure the torque setting on the tool to the appropriate value.

However, there are a large number of other applications which demand an even higher level of accuracy, perhaps down to one centimetre in three dimensions. For example, assembly of a helicopter gearbox requires a large number of closely-spaced bolts to be tightened in a precise sequence. It would be useful to be able to automatically verify that the assembly has been completed correctly by monitoring the location of the tool being used to tighten the bolts. To do this the monitoring system would need to be able to determine, preferably in real time, the position of the tool head accurately enough to distinguish between operations on neighbouring bolts which may be only a centimetre or two apart. Similar situations arise in a car production plant in installing cylinder heads and assembling transmission housings.

Bolt-level positional tracking is difficult to achieve with any reliability using the systems described above, especially in a production environment. In addition to requiring a high level of positional accuracy a further problem is that during an assembly process bolts are often obscured inside other structures, making it difficult to establish the location of the tool head when it engages the bolt.

According to one aspect of the present invention there is provided a system for determining the location of a toolpiece, wherein: the toolpiece is carried by a tool and the tool comprises an imaging device for capturing images of the environment around the tool; and the system comprises an image processor communicatively coupled to the imaging device for receiving images therefrom and having access to one or more reference images of an expected environment, the image processor being configured to compare an image captured by the imaging device with at least one reference image to identify a match therebetween and to determine in dependence on characteristics of that match the location of the toolpiece.

According to a second aspect of the present invention there is provided a hand-held assembly tool comprising: a toolpiece or a mechanical coupling for attachment to a toolpiece; a drive unit for driving the toolpiece or the coupling to move so as to perform an assembly operation; and an imaging device for capturing images of the environment around the tool.

According to a third aspect of the present invention there is provided a method for assembling a workpiece having a plurality of fixings thereon by means of a tool comprising an imaging device for capturing images of the environment around the tool and having an automatically configurable operating mode, the method comprising: repeatedly comparing images captured by the imaging device with one or more reference image of an expected environment to identify a match therebetween and determining in dependence on characteristics of that match the location of the toolpiece relative to the workpiece; and automatically setting the operating mode of the tool to a first value when the determined location is in the vicinity of a first one of the fixings; and. automatically setting the operating mode of the tool to a second value different from the first value when the determined location is in the vicinity of a second one of the fixings.

The image processor may be configured to compare an image captured by the imaging device with the at least one reference image by applying one or more geometric transformations to one or both of the images so as to achieve a match between the images. The said characteristics of the match may include the nature of the geometric transformations for which the match is achieved. The match may be achieved when there is greater than a predetermined degree of visual similarity between substantial parts of the captured image and the reference image.

The image processor may have access to a reference location corresponding to each reference image. The image processor may be configured to determine the location of the toolpiece in dependence on the reference location for the at least one reference image matched to the image captured by the imaging device.

The system may comprise a data store storing the or each reference image and the or each corresponding reference location.

The at least one reference image may be a photograph or a simulation image: i.e. an image generated by simulation.

The imaging device may be a camera capable of determining the range from the camera to a plurality of subjects represented in the image captured by the imaging device. The at least one reference image may be a three-dimensional representation of an expected environment.

The system may comprise a memory storing a predetermined spatial relationship between the imaging device and the toolpiece. The processor may be is configured to determine the location of the toolpiece in dependence on the predetermined spatial relationship.

The image processor may be remote from or local to the tool.

The tool may have an automatically configurable operating mode. The system may comprise a memory storing for each of a plurality of locations an indication of a respective operating mode. The image processor may be configured to determine whether the determined location of the toolpiece corresponds to one of the stored locations and if it does to configure the tool to operate in the operating mode indicated in respect of that location.

The operating mode may be one of a maximum torque, a maximum force, an operating speed and an operating direction.

The image processor may be configured to inhibit operation of the tool if the location of the toolpiece does not correspond to one of the stored locations.

The image processor may be configured to store a series of determined locations of the toolpiece over time.

The system may comprise a secondary mechanism for estimating the location of the tool. The image processor may have access to multiple reference images of an expected environment. The image processor may be configured to select one or more reference images for comparison with an image captured by the imaging device in dependence on a location of the tool estimated by the secondary mechanism.

The secondary mechanism may comprise a radio transmitter comprised by the tool, a plurality of radio receivers for receiving radio signals transmitted by the radio transmitter, and a processor for processing the signals received by the radio receivers to estimate the location of the tool.

The secondary mechanism may be accurate to no less than 10 cm. The image processor may be capable of determining the location of the toolpiece to an accuracy of less than 5 cm.

The image processor may be configured to, on identifying a match between an image captured by the imaging device and a reference image, compare non-matched portions of the captured image and the reference image, and on identifying non-matched portions that have corresponding offsets from matched portions of the respective images but that differ substantially from each other, determine those non-matched portions as representing an obscured part of the environment.

The image processor may be configured to, on identifying an obscured part of the environment, subsequently ignore portions of the reference image(s) representing the obscured part of the environment when comparing an image captured by the imaging device with a reference image.

The image processor may be configured to, on identifying an obscured part of the environment, store an image captured by the imaging device as a reference image of the obscured part of the environment.

The tool may comprise at least one inertial motion sensor for sensing motion of the tool. The tool may be configured to provide output from the inertial motion sensor to the image processor, and the image processor may be configured to, if it is inhibited from deriving a position for the toolhead in dependence on an image captured by the imaging device, derive a position for the toolhead in dependence on data from the motion sensor.

The said secondary mechanism may comprise the motion sensor.

The tool may be a hand-held assembly tool.

The said first one of the fixings and the second one of the fixings hold a common pair of parts of the workpiece together. The fixings may be bolts, screws, nuts or studs.

The image processor may be provided in the form of a single microprocessor or its functions may be distributed between multiple microprocessors at the same or different locations.

The present invention will now be described by way of example with reference to the accompanying drawings. In the drawings.

In the systems to be described below, a tool is equipped with one or more sensors that are capable of sensing the environment immediately around the tool. The output of those sensors is compared with pre-stored expected characteristics of the environment. Based on that comparison the location of the head of the tool can be determined with sufficient accuracy to be able to know which bolt in an assembly the tool is engaged with.

Figure 1:
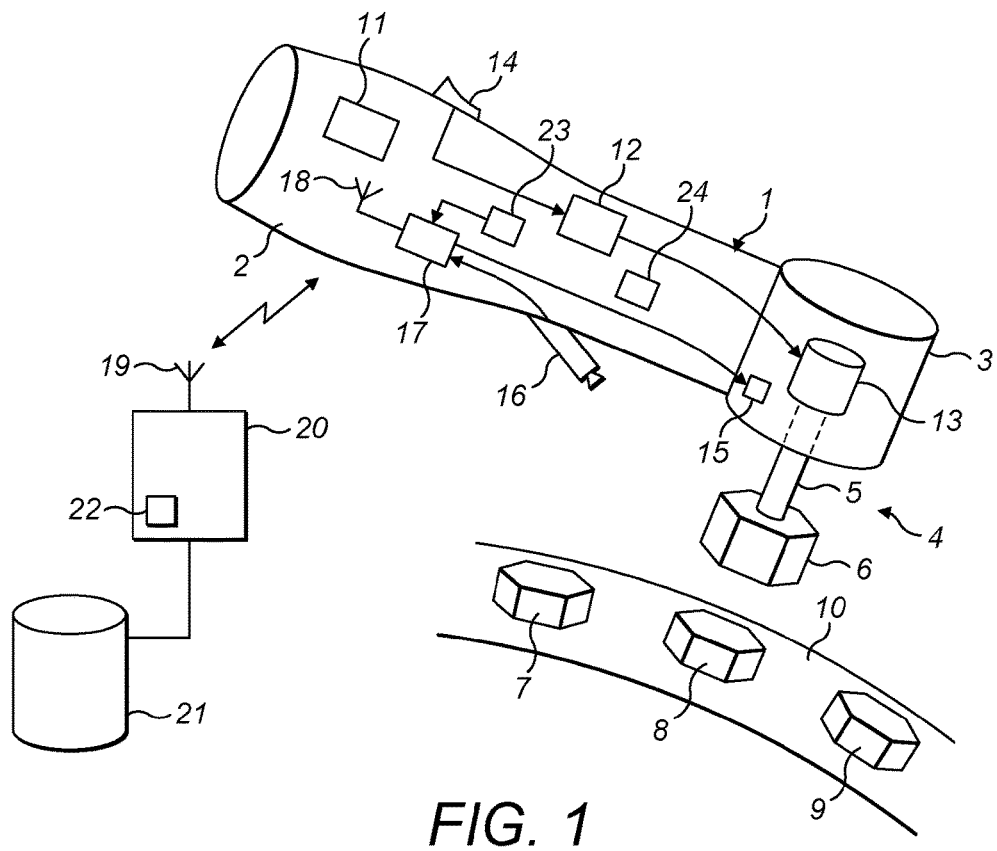
FIG. 1 shows an example of a positioning system for a tool.

FIG. 1 shows a specific example of this system. A powered wrench 1 has a body 2 intended to be held by a user and a head section 4 for performing driving operations. The head section 4 includes a motor housing 3, comprising a drive motor 13, a drive shaft 5 which protrudes from the motor housing and a toolpiece 6. The motor 13 is capable of driving the shaft 5 and hence the toolpiece 6 to rotate relative to the motor housing 3. The motor 13 could be at least partially located in the body 2. In this example the toolpiece is a hex socket, but it could take any other suitable form. The hex socket 6 is sized to engage bolts 7, 8, 9 which form part of a workpiece 10. The bolts could all be intended to hold a common pair of components together.

The tool comprises a battery 11 which powers its operations. Alternatively, the tool could be powered by an electrical wire connected to a mains electricity supply. Or the tool could be a pneumatically driven tool, having an electrical supply (e.g. from a local battery) to power only its computation operations.

The tool has a motor controller 12 which controls the operation of the motor 13 under the command of an operator switch 14. The motor is configured to apply a torque that is limited by the present setting of a torque limiter 15. The torque limiter could be an electrical controller that limits the performance of the motor 13 (e.g. via the motor controller 12), or it could be a mechanical device such as a slip clutch located in the output shaft 5. In the case of a pneumatic tool, the torque limiter could similarly operate to restrict the developed drive torque or to relieve torque in the output shaft.

The tool comprises a camera 16. In this example the camera is attached to the body 2 of the tool, but it could be attached elsewhere on the tool. When the tool is in operation the camera 16 captures a video stream depicting the environment around the tool. The video stream is passed to a local control unit 17. The local control unit transmits the video stream wirelessly via an antenna 18 and a remote antenna 19 to a remote processing unit 20. The remote processing unit 20 can process the video stream in a manner that will be described below in order to estimate the location of the tool, specifically the head 4 of the tool and most specifically the toolpiece 6.

Before the tool 1 is to be used to work on the workpiece 10, the system is configured by storing in a database 21 a set of images of the working environment on and around a reference workpiece. These images can be captured using a conventional hand-held camera or using a camera mounted on a tool like tool 1. The reference workpiece can simply be a production workpiece chosen at random to serve as an exemplar. The images may include images of the workpiece in different configurations, for example with different numbers or sets of sub-parts (e.g. bolts 7-9) installed and in different lighting conditions. The images stored in database 21 may include images of the working environment on and around multiple different workpieces (for example different types of cylinder heads, different seats or colours of seats), and for workpieces in different surroundings (for example seats installed in different car bodies).

When the processor 20 receives a video feed from the tool 1 it attempts to match frames of that feed to the images stored in the database 21. It does this by comparing the images, under a range of geometric transformations, with the stored images. The transformations can include any one or more of:

scaling transformations, to enable a match to a similar part of the imaged environment captured at a different viewing range;

trapezoid transformations, to enable a match to a similar part of the imaged environment captured at a different viewing angle;

translational transformations, to enable matches between different parts of the captured and stored images;

rotational transformations, to enable a match to a similar part of the imaged environment captured at a different orientation; and brightness, contrast and colour transformations, to enable a match to a similar part of the imaged environment captured under different lighting conditions or to enable a match to a similar shaped part but of a different colour or material.

The processor 20 applies a range of these transformations, alone or in combination, to received frames of the captured image stream, and then scans the stored images to identify a match between part or all of the captured image and part or all of one of the stored images. To simplify the process of matching the images, the process of determining a match may be performed on monochrome versions of the images, or may be performed by comparing the location of high contrast edges or other distinct features in the captured image and the stored image. Other image comparison techniques can be used. A match may be deemed to exist when there is greater than a pre-determined level of similarity between part or all of a captured image and part or all of a stored image. That similarity could be defined by respect to numbers or proportions of pixels, blocks of pixels, or image features such as edges. The images may include many fine-scale features that in isolation have a similar appearance. Therefore, the processor 20 is preferably configured to accept a match only when a sufficient area of image is matched, or only when image portions exceeding a pre-set level of complexity match each other.

The database 21 holds metadata for each of the images it stores. That metadata includes information identifying the location of the image: for example the three-dimensional coordinates of one or more reference points in the image. The coordinates can conveniently be by reference to a defined location on the relevant workpiece. The metadata may also include an indication of the workpiece to which the image relates: for example to a particular car body or engine component.

Once the processor 20 has identified a match between the captured image from the tool and a stored image, it can then determine the location of the toolpiece 6. To do that it determines an offset from one or more of the reference points of the image in dependence on (i) the transformations applied to the image in order to achieve the match and (ii) the characteristics of the camera 16 and the tool 1, for example the viewing angle of the camera's lens and the spatial relationship between the camera 16 and the toolpiece 6. The characteristics of the camera and the tool can be pre-stored in memory 22 in the processor 20. The memory 22 may store that data for multiple types of tool, and may be informed of the type or identity of the particular tool 1 by a transmission from the local controller 17. Instead of determining an offset from a reference point in the reference image, the metadata could store the location from which the reference image was captured and the processor 20 could determine the location of the toolpiece 6 as an offset from the image capture reference point in an analogous way to that used to determine the location based on an offset from a reference point in the image itself.

The reference images preferably depict exclusively or predominantly elements of the expected environment of the workpiece that are static with the workpiece during expected use of the tool. In that way the location of the toolpiece can readily be determined as a location relative to the workpiece. That simplifies the task of establishing which part of the workpiece the toolpiece is working on.

Since the camera 16 can capture images of the environment around the tool, the location of the toolpiece 6 can be determined relatively accurately: for example to within a few centimetres. The camera is particularly effective when the tool is being operated in close proximity to other parts, as for example when it is being used in a confined space. Then the camera can be relatively close to the visible features around the tool, meaning that the image comparison operation can yield a particularly accurate tool position. When the toolpiece can be located to within a few centimetres it is possible to determine which part of a workpiece it is operating on: for example which of a number of adjacent bolts, nuts, screws or studs it is driving.

Once the location of the toolpiece 6 is known, that location can be used for a range of purposes.

In one example it can be used to verify that assembly operations are being performed correctly (e.g. that bolts are tightened in a correct sequence). To do this, the locations of the tool piece over time can be stored by the processor 20 and compared with a reference working pattern. An alert can be raised if the sequence of locations of the tool piece deviates materially from the reference working pattern. The tool may also transmit to the processor 20 an indication of when the motor 13 is being driven and/or the applied drive torque. That information may also be compared with the reference working pattern, allowing the processor 20 to determine not just that the toolpiece has visited the required locations but that bolts have been tightened in those locations, that the bolts have been tightened in the correct order and that each one has been tightened to the correct torque. In this way, it is possible to verify that the bolts of a component such as a cylinder head have been tightened in the correct order and/or to the correct torque, or that all the bolts of a component such as a sump pan have been tightened individually (irrespective of order).

In another example, the location of the tool can be used to control the operation of the tool. It may be that different parts of a single workpiece need to be worked on with different settings of the tool. For example, different bolts may require tightening to different torques or with different drive speeds, or some bolts may have reverse threads and need to be tightened by anti-clockwise operation of the motor 13. The processor 20 can store in memory 22 a map of tool settings for different locations on the workpiece. Then when the toolpiece is located at a particular location it can transmit to the local controller 17 a setting to be applied to the tool. In the case of a torque setting the controller 17 can then set the torque limiter 15 accordingly. Other settings could be applied in different ways, for example by the local controller 17 signalling the motor controller 12 to function in a desired way. In this way the tool can automatically be adapted to working requirements for different points on a single workpiece. The tool settings may be sent from the processor 20 automatically when it determines that the toolpiece 6 is at the location of a part on the workpiece for which it stores setting information. Alternatively, the local controller may be configured to request settings from the processor 20 automatically in response to the user actuating the operating switch 14 or in response to the tool detecting that it is engaged with a part of the workpiece (e.g. by means of a proximity sensor in the toolpiece).

A workpiece such as a car engine may have multiple bolts (separated by small distances, perhaps only 1 cm or so) which need tightening at any particular stage of production, and those bolts may have different torque requirements. By knowing to a bolt-level precision which bolt the tool is attached to at any one time before the tightening operation is performed the tool can be set to the appropriate torque. This improves manufacturing efficiency and reliability.

In summary, one or more cameras 16 are attached to the tool 1 at known points. Images captured by the camera(s) are sent to a computation unit 20, which compares the captured images with the stored images in the database 21. The comparison of the captured images and the stored images may be by image correlation or other comparison techniques. The comparison can take account of the potential scale, rotation, translation and perspective transformations due to the relative position of the camera(s) 16 and the environment around it/them. When a match (for a given scale, rotation, translation and perspective) between the captured and stored images is determined by the computation unit 20, the parameters of those transformations can be used to calculate, by standard geometric methods, the 3D location and orientation of the camera(s) 16 relative to its/their environment. In turn, using the known position and orientation of the camera(s) 16 relative to the head of the tool 4, 6, and the measured position and orientation of the camera(s) 16 relative to its/their environment, the position of the head of the tool 4, 6 relative to the workpiece 7, 8, 9, 10 can be found. When the tool 1 is activated to begin tightening a bolt 7, 8, 9, the location of the head of the tool 4, 6 can be compared by the computation unit 20 with the locations of the bolts stored in memory 22, and the desired torque setting for the closest match can be retrieved from memory 22 and programmed into the tool 1. After the tightening operation is complete, the achieved torque for the bolt 7, 8, 9 whose location most closely matched the position of the head of the tool 4, 6 can also be recorded by the computation unit 20.

The camera 16 could be a time-of-flight (TOF) camera. A TOF camera is able to sense the depth (i.e. the distance away from the focal plane of the camera) of points in the images it captures. In addition to, or instead of, storing visual images of the exemplar environment/workpiece the database 21 can store one or more three-dimensional maps of the environment and/or the workpiece suitable for matching to the three-dimensional data captured by the TOF camera. Then the processor 20 can match the captured data to the stored reference data in an analogous way to that previously described, and thereby derive the location of the toolpiece 6. The processor could perform matching using both visible images and three-dimensional data.

The ability of the processor 20 to match the images from the camera 16 to the images stored in the database 21 will depend on the degree of differentiation in the workpiece and its environment. If the workpiece and the environment are particularly uniform, or if similar parts of the workpiece or the environment have similar appearances (e.g. as with a set of bolts surrounding a uniform round shaft), the workpiece or the environment around it could be adapted to permit the tool to be located more accurately. For example, the workpiece could carry some visible feature or surface relief formation to differentiate one part from another. Such a feature or formation could be moulded, cast or tooled into the workpiece, or could be applied to the workpiece by printing or etching or applying an adhesive marker. Furthermore, the working pattern could be chosen to assist in locating the tool. The working pattern could be to first install one or more bolts at places where the location of the tool is initially differentiable, and then to install other bolts at places where the location of the tool is differentiable by reference to already-installed bolts.

The determination of the location of the tool and/or the toolpiece may be assisted by other techniques, as will now be described.

The tool 1 could comprise an inertial motion detector 23. The inertial motion detector could use gyroscopes and/or accelerometers to detect motion of the tool. The output of the motion detector 23 is passed to the controller 17. The controller 17 can transmit the detected motion to the processor 20. The processor 20 can use the motion data in a number of ways. First, it can use the motion data to help analyse the images captured by the camera with a view to matching them to the stored image data. The set of transformations to be applied to the captured image to permit it to be matched to a stored image could be selected, or certain selected transformations could be prioritised, in dependence on the motion data. Similarly, which of the stored images the captured image is to be compared to may be selected in dependence on the motion data. This may reduce the time needed to match the stored image to a captured image. Second, it can use the motion data to estimate the location of the tool for workflow purposes if the position of the tool cannot be determined for the time being by means of the captured images. Although the inertially-derived motion data may be expected to degrade in accuracy over time, during a short interval between the toolpiece being located by other means an inertially-derived position may be adequate for selecting settings of the tool or recording the activities of the tool.

In another example, the tool may be being used in a production facility where the state or environment of a workpiece changes as it moves through the facility along the line. For example, the workpiece may be a vehicle body on a production line. As the body progresses along the production line increasing numbers of ancillary parts such as the engine, running gear, interior trim and doors are attached to the body. These change the appearance of the body and its environment. The database 21 may store many images of a reference body in different states along the production line. When the processor 20 receives an image from the tool 1 it must match the captured image against one of those images. That may require a considerable amount of processing if there are many stored images. To simplify that processing, the processor 20 may select or prioritise a subset of the stored images for comparison with the captured image in dependence on a coarse position of the tool as determined by another mechanism. This is illustrated in FIG. 2.

Figure 2:
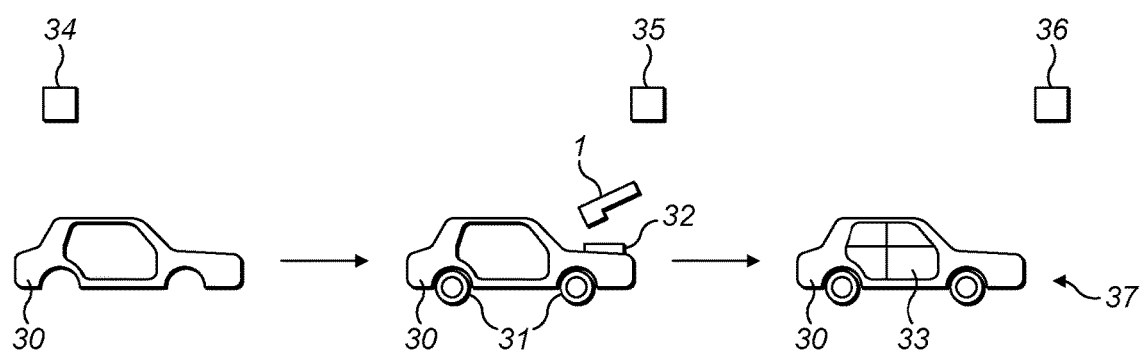
FIG. 2 shows a tool employed on a production line.

FIG. 2 shows a car production line 37. Car bodies 30 move along the production line, and additional components such as wheels 31, engines 32 and doors 33 are added to the bodies as they progress along the line. Tool 1 is being used to assemble the cars. Tool 1 comprises a radio transmitter 24 (see FIG. 1) which cooperates with radio receivers 34, 35, 36 located at known locations around the production line. The signals received by the radio receivers can be processed to estimate the location of the tool, for example by measuring the time-of-arrival and angle-of-arrival at the receivers of signals from the transmitter 24. Typically that might yield the location of the tool to within a few tens of centimetres. Other coarse positioning techniques could be used to achieve a similar result. Once the coarse location of the tool is known, the processor 20 can estimate the state of the vehicle body at that location. Metadata stored with the images in database 21 may indicate the state of production and/or the coarse location on the production line to which they relate. The processor 20 can then select or prioritise for comparison with the captured images the stored images that relate to the coarse location on the production line where the tool currently is. In the example of FIG. 2, that means the processor will preferentially attempt to match an image captured by the tool with images that pertain to the body 30 with wheels 31 and engine 32 installed but without doors 33.

Thus, in this embodiment the database 21 stores sets of information regarding the shape and/or appearance of the item 30 being assembled for each stage in the production process. Information from the camera 16 on the tool 1 being used to assemble the item is compared against these sets of information by the computation unit 20. Although the computation unit 20 could attempt to compare the data captured by camera 16 against the entirety of the images in the database 21 (which collectively represent the appearance and/or shape of the object 30 at any point in the process), this could involve a lengthy correlation/matching computation which might be difficult to perform in real time. Furthermore, as the volume of data to be searched for a match increases, the probability of a false match also increases. In order to reduce the volume of data to be searched, it is advantageous for the computation unit 20 to be guided in its search by information indicating the current stage of the production process for the item 30. If this information is known, the computation unit 20 can restrict its search for matches of the data from the camera 16 with only the potentially relevant sets of information in the database 21.

There are a number of possible sources of information which can inform the computation unit 20 of the current stage of the production process for the item 30.

1. If the tool 1 is a tethered tool, confined to a particular station of the assembly line 37, then the computation unit 20 may be configured to only attempt matches against information sets in the database 21 that reflect the appearance and/or shape of the 30 item at that point in the assembly process.

2. The tool 1 may be located (at a lower level of accuracy than is required for bolt-level location) by an auxiliary location system. For example, the location system provided by units 24, 34, 35 and 36 may be used. That could be an ultrawideband radio system capable of locating the tool 1 to an accuracy of around 15 cm in three dimensions. That level of accuracy is sufficient to determine the location in the assembly process of the particular item 30 under assembly. This location is passed to the computation unit 20, which uses it to determine the set of information in the database 21 against which data from the camera 16 should be compared. The mapping from physical location to assembly process stage may be stored in the computation unit 20 or the various image/shape information sets in the database 21 may be indexed by location.

3. Different workpieces travelling along the production line may be adapted in different ways. For example, they may have different engines or interior trims, meaning that they have different appearances. The processor 20 may determine which appearance or shape the workpiece is expected to have at a particular stage based on a work schedule for the production line. The work schedule may indicate which workpiece is at which stage of the production line, and the build plan for that workpiece. The processor can then select or prioritise images that relate to the workpiece scheduled to be on the production line at the coarse location of the tool, and for the state of build scheduled for the workpiece at that stage of the production line. Alternatively, or in addition, the state of the workpiece can be determined in dependence on work known to have been carried out on it by tool 1 or other tools. As tools act on the workpiece those actions can be stored, e.g. in the database 21. This information can, for example, indicate that other tools have previously performed certain bolt-tightening operations on the item 30, thus changing its appearance and/or shape. The processor 20 can select or prioritise certain images for matching with a captured image in dependence on that historic tool activity data.

This list is not exhaustive. It only illustrates examples of techniques that might be used.

On a production line there can be many different individual items in production at the same time. Any of the schemes described previously may be extended so that the database 21 stores information about the shape/appearance and tool settings for each of the items currently on the production line.

Other systems may inform the computation unit 20 of the current locations of each of the workpieces on a production line. These systems may include ultrawideband (UWB) tracking systems monitoring individual tracking tags (similar to tag 24) attached to the workpieces; or positional encoders attached to the mechanism for moving the workpieces along the production line which, together with knowledge about when a particular item was placed on the line, are sufficient to determine the workpiece's location in the factory; or even manual processes. When a particular tool 1 is used on a particular workpiece 30, the coarse location of the tool 1 in the factory (determined, e.g., in one of the ways described above) is compared by the computation unit 20 with the known locations of workpieces 30 on the production line. From that comparison the computation unit 20 determines the individual workpiece which is located closest to the tool 1, and looks up in a datastore (e.g. 21 or 22) the current shape/appearance of that item in order to inform the process of fine-scale tool position determination using information from the tool-borne camera 16. When a tool tightening operation has been performed on a bolt on the workpiece, the processor 20 stores information from the tool 1 about the results of the tightening operation in the database 21 in relation to that individual workpiece. In modern factories multiple different types of workpiece (e.g. different makes, models and colours of car) are produced on the same production line. The appearance and shape of the individual workpieces may differ. When a new workpiece 30 enters the production line, the database 21 can be is updated with information about the shape/appearance (at each production stage) that should be expected of that particular item. Then, when a tool 1 is used on a particular workpiece the computation unit 20 can use information about the current locations of the workpieces and the coarse or fine location of the tool 1 to determine which individual workpiece the tool is operating upon. With that information images pertaining to the expected appearance/shape for that individual workpiece at that stage of the production process can be retrieved from the database 21 in order to assist the computation unit 20 to match an image from the camera 16.

Multiple tools may be working on a single workpiece and communicating with processor 20 to determine their position. An image received from one tool may indicate that a part of the workpiece or its environment is obscured, for example by a hose, cable or a worker. The processor may use that information to assist future operations to determine the location of that or another tool. For example, it may estimate the zone where the obscuring object is located and subsequently prioritise matching features located elsewhere in the stored images. To achieve this, once the processor 20 has formed a match between a part of a captured image and a part of a stored image it may then compare the remainder of the captured image with the remainder of the stored image. If it detects a substantial anomaly between those remainder parts of the image it may take that anomaly to represent an obscuring object. It can then store the location of the obscuring object and subsequently ignore matching parts of captured images to parts of stored images that represent that location.

When a first tool is being operated on a workpiece, information from one or more cameras attached to the tool are compared by a computation unit 20 against a set of stored information regarding the appearance/shape of the item workpiece, in order to calculate the location of the head of the tool, so that the precise identity of a part (e.g. a bolt head) on which the tool is being used can be determined. There could be an obstruction (perhaps a cable draped across the workpiece) covering up some of the workpiece. If there is a sufficient of the appearance/shape of workpiece still visible to allow the location of the tool to be determined, the computation unit 20 may then determine (e.g. by an inability to match the captured scene in the obscured area of the field of view to the stored information in the database 21) that there are specific areas of the image captured by the camera 16 which could relate to an obstruction. Since the computation unit 20 knows the location and orientation of the tool 1 and the camera 16, it can store information regarding the location of the obscuring object. The computation unit could even store in database 21 the image captured by the tool of the workpiece or its environment with the obscuring object present. Then to later estimate the location of the same or another tool the processor can either ignore for matching purposes the area determined to be obscured, or it could attempt to match newly captured images to the stored image that includes the obscuring object. These techniques can potentially increase the speed at which the computation unit 20 can determine a match for the later-captured scene information and can also reduce the probability of a false match.

In the examples described above, the tool has been described as a device for applying a torque to bolts. The tool could take other forms. It could for example be a screwdriver, nutrunner, drill, saw or spray gun. It could be manually operated: for example it could be a manual spanner, screwdriver or torque wrench. The part of the workpiece being acted on by the tool could take any suitable form. It could for example be a bolt, screw, nut, stud, clip, hole or a bulk part of the workpiece to be drilled, cut or coated.

The tool could have multiple cameras directed in different directions to help locate the tool irrespective of its orientation. It may be helpful if a camera is directed towards the toolpiece since that may assist in locating the toolpiece precisely, but that is not essential. The tool could include a light for illuminating the workpiece and/or the environment around the workpiece to help the camera gather images to which a match can readily be made.

The stored images could, as described above, be images captured of example workpieces. Alternatively, the stored images could be derived from simulations, for example from three-dimensional CAD (computer-aided design) models of the workpiece and/or the environment. This may be particularly helpful when the images are intended to represent a workpiece that has many different production options. For example, a car may have a large number of optional components and as a result there may be a vast number of possible component combinations. Rather than capture images of example cars in every possible combination, it may be better to populate the database 21 with automatically generated simulated images for some or all component combinations. Three-dimensional information for use with TOF cameras may be treated in the same way.

The images stored in database 21 may be direct photographic representations. Alternatively, they may be simplified, for example by processing them to emphasise edge detail and/or de-emphasise texture.

The tool may be actuated when the operator indicates that the requisite operation should proceed, e.g. by actuating switch 14, or by the tool automatically starting the operation when it senses that the toolpiece is correctly engaged with the workpiece. At that point the correct settings for the individual part of the workpiece to which the toolpiece is engaged can be applied, or have already been applied, to the tool, and the requisite operation is performed.

Information derived from the position of the tool may be used to restrict or inhibit the operation of the tool. For example, the motor controller 12 may be controlled by local controller 17 so as only to activate the motor 13 when the toolpiece 6 is at a location where it is or can be correctly engaged with the workpiece. This can help avoid damage to the workpiece, or injury to workers. The tool may be a hand-held tool. The tool may be an assembly tool.

The toolpiece may be non-removably attached to the tool. Alternatively, the tool may be capable of accepting multiple toolpieces: for example hex sockets, screwdriver bits, drills, saws and paint canisters of different sizes and shapes. The toolpieces may attach to a mechanical coupling on the tool, for example on shaft 5. The mechanical coupling may be a standard tool coupling, for example a ⅜", ½" or ¾" square boss or a 5/16" hex socket.

The link between the camera 16 and the processor 20 may be wireless, as illustrated in FIG. 1, or wired. The processor 20 could be located in the tool, as could image database 21.

The processor 20 may be implemented as a single microprocessor or distributed among multiple microprocessors at the same or different locations. The processor 20 can be configured to perform its functions by executing software code stored non-transiently in a memory, for example memory 22. Memory 22 and database 21 could be combined or divided between any number of physical memory units at the same or different locations.

In the process described above, the captured image is transformed to map it to a stored image. Instead, the stored image could be transformed to map it to the captured image, or both could be transformed. The geometric process of determining the position of the tool in dependence on the transformation(s) that led to a match can then be adapted accordingly.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system configured to determine the location of a toolpiece carried by a tool comprising an imaging device configured to capture images of the environment around the tool, the system comprising:
an image processor communicatively coupled to the imaging device so as to receive images therefrom, said image processor being configured to:
access a plurality of reference images representing an expected environment from a data store;
compare an image captured by the imaging device with at least one reference image to identify a match there between;
access a reference location corresponding to each reference image from the datastore; and
determine the location of the toolpiece in dependence on the reference location for the at least one reference image matched to the image captured by the imaging device;
wherein the determined location of the toolpiece is used to verify that a previous operation of the tool has been performed correctly or to control a further operation of the tool.

2. A system as claimed in claim 1, wherein:
the image processor is configured to compare an image captured by the imaging device with the at least one reference image by applying one or more transformations to one or both of the images so as to achieve a match between the images; and
the image processor is configured to determine the location of the toolpiece in dependence on the nature of the geometric transformations for which the match is achieved.

3. A system as claimed in claim 1, wherein the imaging device is a camera capable of determining the range from the camera to a plurality of subjects represented in the image captured by the imaging device, and the at least one reference image is a three-dimensional representation of an expected environment.

4. A system as claimed in claim 1, further comprising a memory configured to store a predetermined spatial relationship between the imaging device and the toolpiece, and wherein the processor is configured to determine the location of the toolpiece in dependence on the predetermined spatial relationship.

5. A system as claimed in claim 1, wherein the image processor is remote from the tool.

6. A system as claimed in claim 1, wherein the tool has an automatically configurable operating mode, the system comprises a memory configured to store for each of a plurality of locations an indication of a respective operating mode, and the image processor is configured to determine whether the determined location of the toolpiece corresponds to one of the stored locations and if it does to configure the tool to operate in the operating mode indicated in respect of that location.

7. A system as claimed in claim 6, wherein the operating mode is one of a maximum torque, a maximum force, an operating speed and an operating direction.

8. A system as claimed in claim 6, wherein the image processor is configured to inhibit operation of the tool if the location of the toolpiece does not correspond to one of the stored locations.

9. A system as claimed in claim 1, wherein the image processor is configured to store a series of determined locations of the toolpiece over time.

10. A system as claimed in claim 1, further comprising a secondary mechanism configured to estimate the location of the tool, wherein the image processor is configured to have access to multiple reference images of an expected environment, and the image processor is configured to select one or more reference images for comparison with an image captured by the imaging device in dependence on a location of the tool estimated by the secondary mechanism.

11. A system as claimed in claim 10, wherein the secondary mechanism comprises a radio transmitter comprised by the tool, a plurality of radio receivers configured to receive radio signals transmitted by the radio transmitter, and a processor configured to process the signals received by the radio receivers to estimate the location of the tool.

12. A system as claimed in claim 10, wherein the location determination of the secondary mechanism has a lower level of accuracy than the location determination of the image processor.

13. A system as claimed in claim 1, wherein the image processor is configured to, on identifying a match between an image captured by the imaging device and a reference image, to compare non-matched portions of the captured image and the reference image, and on identifying non-matched portions that have corresponding offsets from matched portions of the respective images but that differ substantially from each other, determine those non-matched portions as representing an obscured part of the environment.

14. A system as claimed in claim 13, wherein the image processor is configured to, on identifying an obscured part of the environment, subsequently ignore portions of the reference image(s) representing the obscured part of the environment when comparing an image captured by the imaging device with a reference image.

15. A system as claimed in claim 13, wherein the image processor is configured to, on identifying an obscured part of the environment, store an image captured by the imaging device as a reference image of the obscured part of the environment.

16. A system as claimed in claim 1, wherein the tool further comprises at least one inertial motion sensor configured to sense motion of the tool, wherein the tool is configured to provide output from the inertial motion sensor to the image processor, and the image processor is configured to, if it is inhibited from deriving a position for the toolhead in dependence on an image captured by the imaging device, derive a position for the toolhead in dependence on data from the motion sensor.

17. A system as claimed in claim 10, wherein the secondary mechanism comprises the motion sensor.

18. A method of assembling a workpiece having a plurality of fixings thereon by means of a tool comprising an imaging device for capturing images of the environment around the tool and having an automatically configurable operating mode, the method comprising:

repeatedly comparing, at an image processing device communicatively coupled to the image processing device so as to receive images therefrom, images captured by the imaging device with at least one reference image of an expected environment to identify a match therebetween, the plurality of reference images being stored in a datastore; and determining in dependence on a reference location corresponding to the at least one reference image matched to the images captured by the imaging device the location of a toolpiece carried by the tool relative to the workpiece, the reference location being stored in a datastore; and automatically setting the operating mode of the tool to a first value when the determined location is in the vicinity of a first one of the fixings; and automatically setting the operating mode of the tool to a second value different from the first value when the determined location is in the vicinity of a second one of the fixings.

19. A method as claimed in claim 18, wherein the first one of the fixings and the second one of the fixings hold a common pair of parts of the workpiece together.

20. A system as claimed in claim 1, wherein the plurality of reference images representing the expected environment comprise one or more of a photograph and a simulation image.

* * * * *